UNITED STATES PATENT OFFICE.

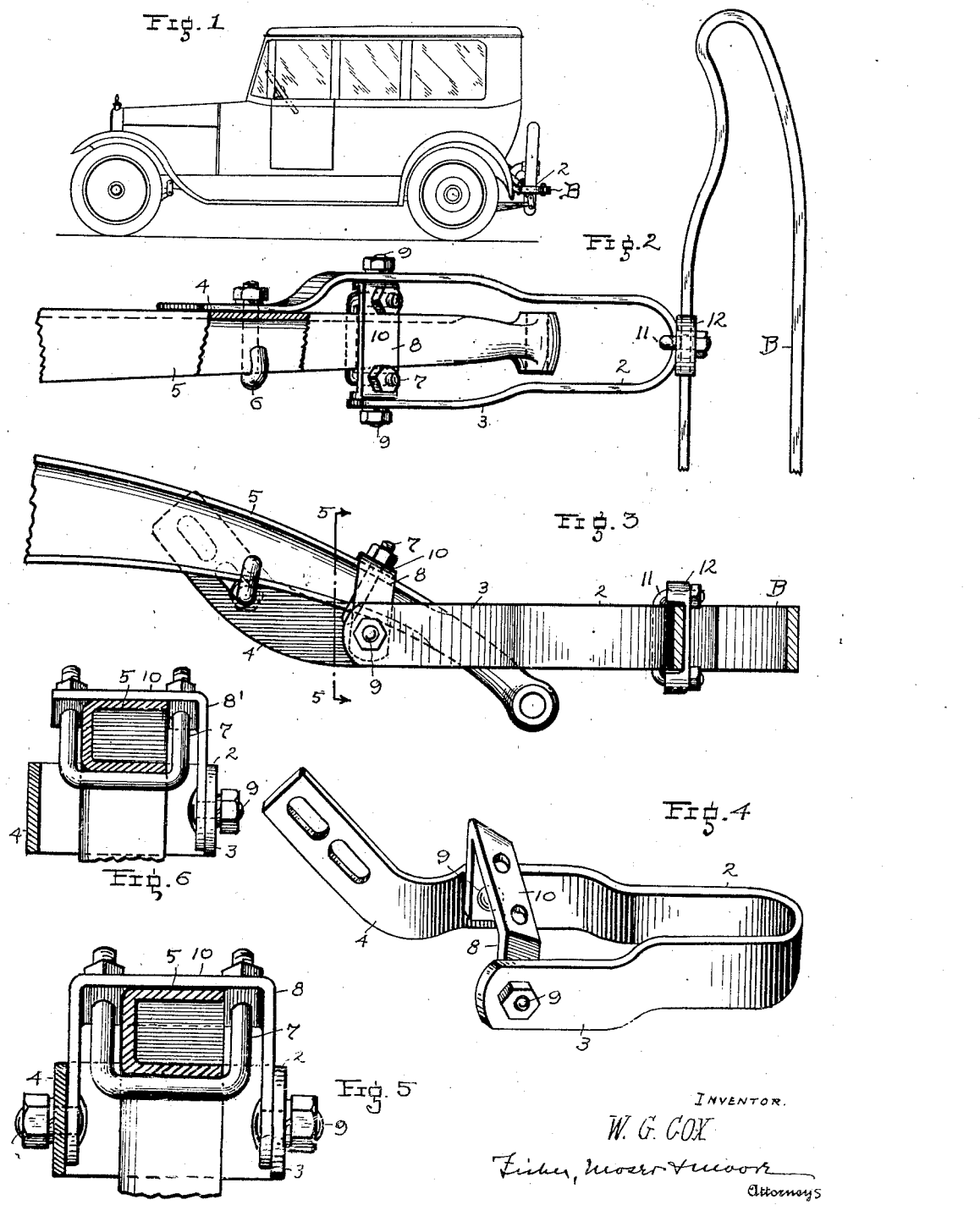

WILLIAM G. COX, OF CLEVELAND, OHIO.

ATTACHMENT BRACKET FOR AUTOMOBILE BUMPERS.

1,411,956.      Specification of Letters Patent.      Patented Apr. 4, 1922.

Application filed January 23, 1922. Serial No. 531,035.

*To all whom it may concern:*

Be it known that I, WILLIAM G. COX, a citizen of the United States, residing at Cleveland, in the county of Cuyahoga and State of Ohio, have invented certain new and useful Improvements in an Attachment Bracket for Automobile Bumpers, of which the following is a specification.

My primary object is to provide a bracket of simple form and construction adapted to facilitate the attachment of a spring buffer or bumper upon the curved ends of the chassis frame of an automobile; and to provide a secure and convenient attachment to frame ends of different shapes and curvatures the bracket includes a pivoted saddle having a coupling bolt adapted to be adjustably clamped upon the curved horn or end of the frame, all substantially as herein shown and described and more distinctly pointed out in the claims.

In the drawing accompanying this application, Fig. 1 is a reduced view of an automobile showing a bumper mounted upon my improved bracket affixed to the rear end of the automobile frame. Fig. 2 is an enlarged plan view of a portion of the frame end and a bracket attached thereto, and also showing a portion of a bumper mounted upon the bracket. Fig. 3 is an elevation of the inner side of the frame and bracket shown in Fig. 1, the bumper being shown in section. Fig. 4 is a perspective view of one form of my improved bracket, and Fig. 5 is a vertical cross-section of the bracket and the channeled frame on line 5—5 of Fig. 3. Fig. 6 is a reduced view corresponding to Fig. 5, but showing a modified form of saddle member.

The attachment of a buffer upon the curved rear ends of an automobile is frequently made difficult by the presence of the number plate, lamps and tire carriers, and their brackets; and the formation of the frame ends also vary considerably. In other words, it often occurs that only a limited amount of room is available to attach and adjust a buffer bracket upon the frame so that a buffer or bumper may be supported at the proper elevation and apart from the frame and all the parts carried thereon at the rear of the body. To meet this situation, I provide a yoke-shaped bracket 2 made of a flat bar, preferably a bar of spring metal, having relatively short and long parallel arms 3 and 4, respectively, the longer arm being curved upwardly at an angle of approximately forty-five degrees and slotted to permit this end to be bolted to the outer side of the curved extension 5 of the chassis frame and which terminates in a shackle eye for the vehicle spring.

As shown, a hook bolt 6 is used to attach arm 4 to extension 5, but a machine bolt or a U-bolt may be employed instead. Arm 4 is also offset outwardly for a portion of its length to space the arm apart from the outer side of extension 5, and the end portion of short arm 3 is also offset relatively to the bow or round yoke portion of the bracket to afford ample room or space for the frame extension 5 and for suspending a coupling bolt 7 of U-shape from a saddle or hanger 8 interposed between the bracket arms and pivotally supported in an upright position upon a short pivot bolt 9, extending through the inner end of short arm 3.

When saddle 8 is also in the form of an inverted U both legs thereof are pivotally supported by pivot bolts 9 and the transverse portion 10 of the saddle rests flat upon the upper curved side of frame member 5. Moreover, transverse portion 10 of the saddle is flat and inclined relatively to the legs thereof so that when the legs of U-bolt 7 extend through the spaced bolt openings in transverse portion 10 said bolt will extend downwardly at a different angle than the legs and clamp the flat seating portion 10 of the saddle squarely upon frame extension 5.

In Fig. 6, I show a saddle or hanger member 8' in the form of a right angle, or with only one leg pivotally connected to arm 3 of the bracket, but the U-bolt 7 is suspended in the same way and the parts function in the same way as in the other form of saddle or hanger described. The saddle or hanger member in either case is relatively narrow and can be placed in spanning and rest position at different places upon the top face of curved extension 5 to avoid other brackets or parts which may be present or mounted thereon, and then the main bracket member may be tilted to a horizontal or inclined position upon the pivot bolt before the longer arm 4 is clamped to the frame by bolt 6. Clamping of the U-bolt 7 fixes the saddle rigidly as adjusted upon the frame, and the buffer B is then attached to the rounded portions of the bracket, using a clip bolt 11 and yoke member 12 for that purpose, and it should be understood that the bumper is supported by two similar brackets attached to corresponding extensions of the frame.

What I claim, is—

1. An adjustable bracket for automobile buffers, comprising a yoke-shaped main member having a supporting hanger pivotally connected therewith intermediate its legs, a coupling bolt suspended from said hanger adapted to clamp said parts to a vehicle frame part, and supplemental clamping means for said main member.

2. An adjustable bracket for automobile buffers, comprising a yoke-shaped member having parallel legs, an angular hanger pivotally secured to said member between said legs adapted to rest upon the curved extension of an automobile frame, a clamping bolt depending from said angular hanger, and separate clamping device for one of the legs of said yoke-shaped member.

3. An adjustable bracket for automobile buffers, comprising a yoke-shaped member having one leg thereof bent upwardly at an angle and provided with a bolt opening, a hanger pivotally connected to said member having a transverse portion provided with bolt openings, a coupling bolt extending through said openings and depending from said hanger, and a clamping bolt extending laterally through said bolt opening in said bent leg.

4. An adjustable bracket for automobile buffers, comprising a flat bar bent into U-shape with parallel legs of different lengths, a rest member of angular form pivotally secured between said legs, a U-bolt depending from said rest member intermediate said legs, and means adapted to permit the longer leg to be clamped upon the side member of an automobile frame when said legs and rest member span said side member.

5. An adjustable bracket for automobile buffers comprising a U-shaped member having a pivoted hanger extending transversely between the legs thereof, and U-bolt depending from said hanger on a line diverging from the pivot of said hanger.

6. An adjustable bracket for automobile buffers, comprising a yoke made of a flat metal bar having legs of different length and the longer leg being bent upwardly at an angle and slotted, an angle-shaped hanger pivotally united to said yoke and spanning the space between its legs, a U-bolt suspended from said hanger between said legs, and a clamping bolt for the slotted longer leg of said yoke.

In testimony whereof I affix my signature.

WILLIAM G. COX.